(12) United States Patent
Lellky et al.

(10) Patent No.: US 9,057,934 B2
(45) Date of Patent: Jun. 16, 2015

(54) MOUNTING BRACKET

(71) Applicant: Axis AB, Lund (SE)

(72) Inventors: Jonas Lellky, Veberod (SE); Samir Helaoui, Malmo (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/515,815

(22) Filed: Oct. 16, 2014

(65) Prior Publication Data

US 2015/0139635 A1 May 21, 2015

(30) Foreign Application Priority Data

Nov. 20, 2013 (EP) .................................... 13193657

(51) Int. Cl.
*G03B 17/56* (2006.01)

(52) U.S. Cl.
CPC .................................... *G03B 17/561* (2013.01)

(58) Field of Classification Search
CPC .... G03B 17/561; F16M 11/126; F16M 11/12
See application file for complete search history.

(56) References Cited

U.S. PATENT DOCUMENTS

| | | | |
|---|---|---|---|
| 4,770,382 A | 9/1988 | Lehti | |
| 5,790,910 A * | 8/1998 | Haskin | 396/427 |
| 6,634,804 B1 * | 10/2003 | Toste et al. | 396/427 |
| RE43,806 E * | 11/2012 | Carnevali | 248/181.1 |
| 2004/0258460 A1 | 12/2004 | Taylor | |
| 2008/0226282 A1 * | 9/2008 | Takahashi | 396/427 |
| 2011/0315843 A1 | 12/2011 | Hung | |
| 2013/0034380 A1 | 2/2013 | Cutsforth | |

FOREIGN PATENT DOCUMENTS

GB 2 420 702 6/2006

OTHER PUBLICATIONS

European Search Report issued May 9, 2014 in European Application 13193657, filed on Nov. 20, 2013 ( with Written Opinion).

* cited by examiner

*Primary Examiner* — WB Perkey
(74) *Attorney, Agent, or Firm* — Oblon, McClelland, Maier & Neustadt, L.L.P.

(57) ABSTRACT

According to the present invention, there is provided a bracket for a camera device. The camera device comprises a wall mount, an arm extending from the wall mount, an adjustable camera mount supported by the arm, and a locking element for locking of the camera mount in an adjusted position. The camera mount is being adjustable by tilting and panning by means of a pivot arrangement comprising a socket provided in the arm, a first member seated in the socket, a second member enclosed by the first member, wherein the second member is formed integral with said camera mount, wherein the socket and first member form a pan joint rotatable about a pan axis, and wherein the first member and the second member form a tilt joint rotatable about a tilt axis.

11 Claims, 4 Drawing Sheets

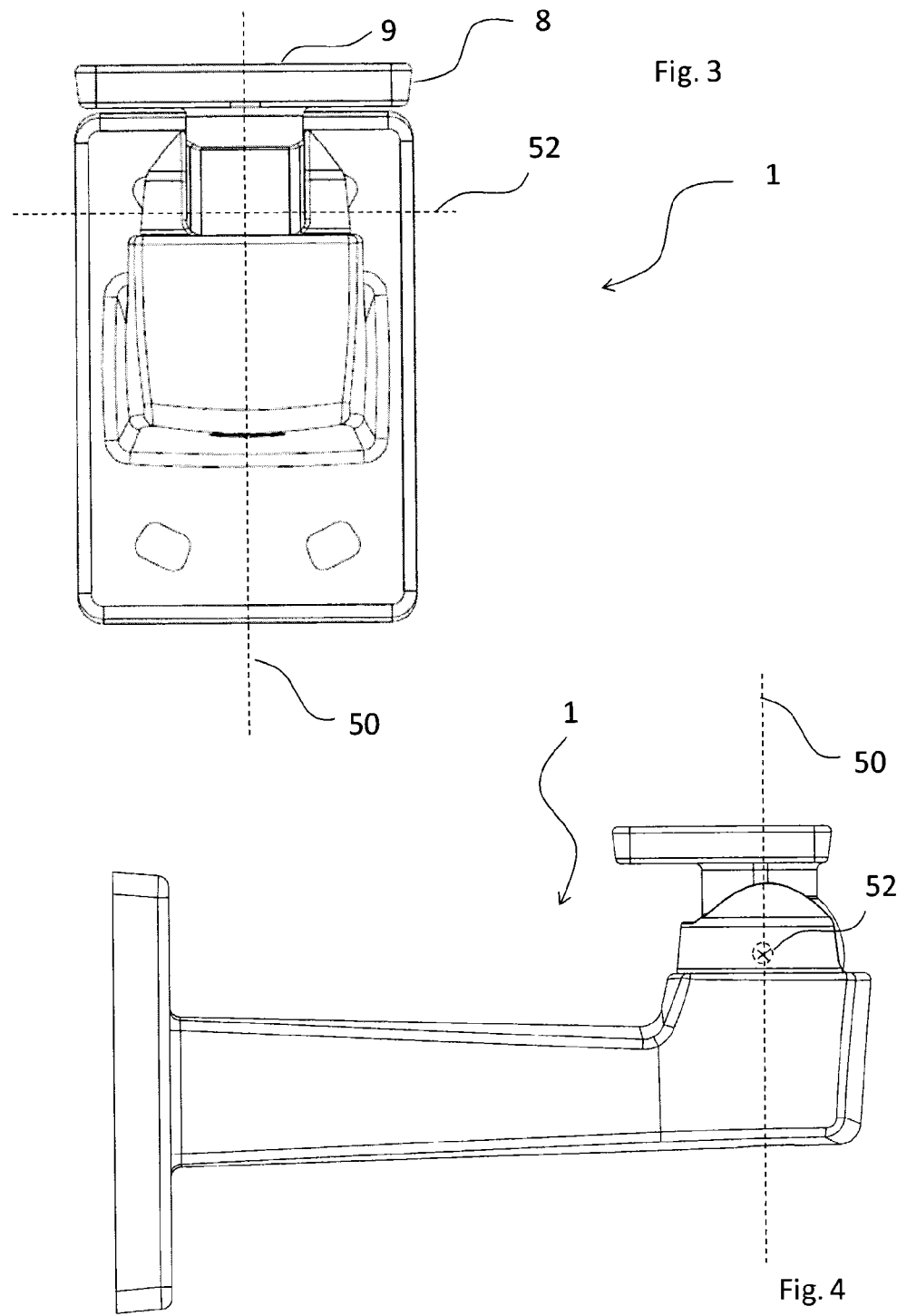

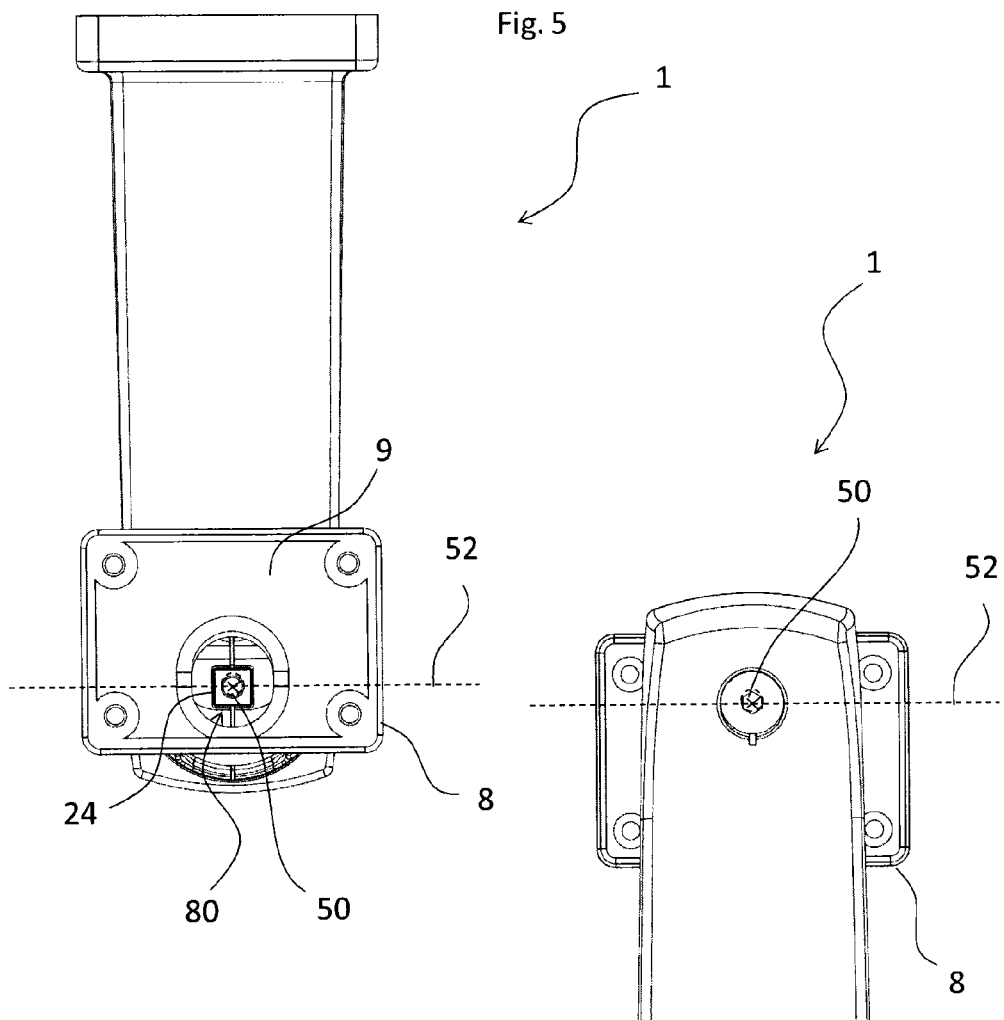

MOUNTING BRACKET

TECHNICAL FIELD

The present invention relates to a bracket for a camera device and camera system.

BACKGROUND

Cameras for monitoring of scenes frequently exist in various environments such as interiors and exteriors of shops, homes, and in outdoor environments such as streets, parking lots and parks. For such and other purposes the camera may be mounted by means of a bracket on, for example, a wall of a building or a post.

The document EP 0 990 833 discloses a camera bracket. Such a camera bracket may have problems with regard to weatherproofing and may be problematic to adjust and install.

It is desirable that the cameras are stably mounted such that they are not unintentionally moved out of their adjusted positions for example by birds or force by weather. Further, it is desirable that the camera can be efficiently adjusted, thus providing the possibility to efficiently direct the camera in a desired direction.

SUMMARY OF INVENTION

An object of the present invention is to provide an efficient bracket for a camera. Another object of the present invention is to provide solutions to problems related to prior art or improvements over prior art, which solutions or improvements may result in improved weatherproofing of the bracket and/or more efficient adjustment of a camera mounted on the bracket.

According to a first aspect of the invention, those and other objects are achieved by a bracket for a camera device comprising a wall mount, an arm extending from the wall mount, an adjustable camera mount supported by the arm, and a locking element for locking of the camera mount in an adjusted position, the camera mount being adjustable by tilting and panning by means of a pivot arrangement. The pivot arrangement comprises a socket provided in the arm, a first member seated in the socket, and a second member enclosed by the first member, wherein the second member is formed integral with said camera mount, wherein the socket and first member form a pan joint rotatable about a pan axis, and wherein the first member and the second member form a tilt joint rotatable about a tilt axis.

Having a pan joint and a tilt joint may provide for efficient adjustments, e.g. since adjustments by tilting may be performed independently to adjustments by panning. Further, it is an advantage to have two well defined axes around which movements may be realized as it provides predictable movements. The camera mount limits or prevents movements of the camera mount around other axes than the pan and tilt axes which is an advantage over having for example a ball joint enabling movement around an undefined number of axes and thereby introducing an unpredictability in the movements.

The camera mount being adjustable by tilting and panning by means of a pivot arrangement is efficient for adjustments of the viewing direction of a camera mounted to the camera mount.

Further, the pivot arrangement comprising the first member seated in the socket, and the second member enclosed by the first member, enables a structure not having any openings exposing the interior of the bracket to the surroundings, thereby making it possible to provide a reliable weatherproofing.

According to an embodiment, the camera mount may have a mount plane, wherein the tilt axis extends in parallel to the mount plane of the camera mount, and the pan axis is orthogonal to the tilt axis. Thus, for example, horizontally aligned images captured by a camera device mounted to the bracket may be realized.

According to one embodiment, the locking element upon activation may be arranged to press the first member against the socket in order to lock a position of the pan joint and to generate locking forces acting on the second member enclosed by the first member for locking of the position of the tilt joint. Thus, efficient locking of both the position of the pan joint and the position of the tilt joint may be achieved by a single locking element.

According to one embodiment, the locking element may comprise a screw extending through a bottom of the socket, whereby the locking element is arranged for locking of the camera mount in an adjusted position by tightening of the screw causing the first member to be pressed against the socket.

According to one embodiment, the first member may comprise a cap shaped section seated in the socket and a protrusion having an extension in the socket and cooperating therewith in order to prevent tilting of the first member relative to the socket. Thus, efficient panning adjustments may be achieved by means of the pan joint, and efficient tilting adjustments may be achieved by means of the tilt joint.

According to one embodiment, the seat of the socket may be frustoconically shaped. With such a frustoconical shape, efficient movement about the pan axis may be achieved. Further, with such a frustoconical shape, efficient locking of the camera mount in an adjusted position may be realized.

According to one embodiment, the cap shaped section of the first member may be frustoconically shaped. Thus, efficient rotation about the pan axis may be achieved. Further, with such a frustoconical shape, efficient locking of the camera mount in an adjusted position may be realized, for example as the frustoconical shape may allow the first member to perform a squeezing action on the second member which is enclosed by the first member.

According to one embodiment, the shape of the seat of the socket may be complementary to the shape of the cap shaped section of the first member.

According to one embodiment, the protrusion may be cylindrically shaped and extending in a cylindrically shaped cavity of the socket. Thus, efficient rotation around the pan axis may be achieved.

According to one embodiment, the protrusion may be circular-cylindrically shaped and extending in a complementary shaped cavity of the socket.

According to one embodiment, the first member may be formed in two pieces which in an assembled state are arranged to enclose the second member. With the first member formed in two pieces, assembling of the bracket may be efficient, and the first member may efficiently enclose the second member. Further, locking forces acting on the second member enclosed by the first member may efficiently be achieved.

According to one embodiment, the tilt joint may comprise a shaft and bearing arrangement.

According to one embodiment, the wall mount, the arm, and the camera mount may comprise cavities for allowing of cables to a camera device to be fitted in the interior of the bracket. Thus, cables may extend from the wall plate to a camera device mounted on the camera mount. Thus, any cables to a camera device mounted on the bracket may be protected, such as from ambient conditions, weather, accidents or vandalism.

According to another aspect of the present invention there is provided a camera system comprising the bracket according to the first aspect of the present invention and a camera supported by the bracket.

Generally, all terms used in the claims are to be interpreted according to their ordinary meaning in the technical field, unless explicitly defined otherwise herein. All references to "a/an/the [element, device, component, means, step, etc.] are to be interpreted openly as referring to at least one instance of said element, device component, means, step, etc., unless explicitly stated otherwise. The steps of any method disclosed herein do not have to be performed in the exact order disclosed, unless explicitly stated.

BRIEF DESCRIPTION OF DRAWINGS

FIG. 3 is a front view of the bracket for a camera according to the embodiment illustrated in FIG. 1, as seen along the arm of the bracket in a direction towards the wall mount.

FIG. 4 is a side view of the bracket for a camera according to the embodiment illustrated in FIG. 1.

FIG. 5 is a top view of the bracket for a camera according to the embodiment illustrated in FIG. 1.

FIG. 6 is a bottom view of the bracket for a camera according to the embodiment illustrated in FIG. 1.

DETAILED DESCRIPTION

The present invention will now be described in more detail with reference to the accompanying drawings, in which embodiments of the invention are shown. The invention may, however, be embodied in many different forms and should not be construed as limited to the embodiments of this detailed description which are provided for thoroughness and completeness of the invention.

Figure 1:
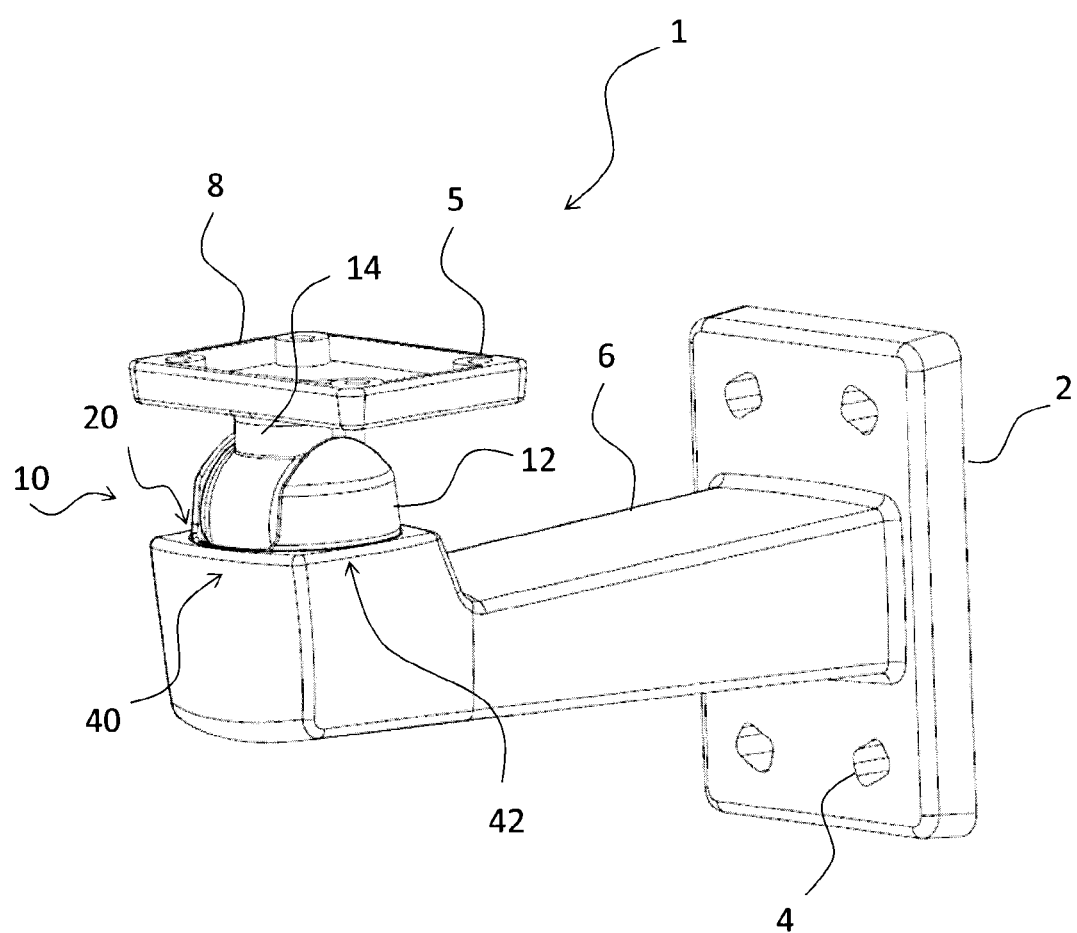
FIG. 1 illustrates a bracket for a camera according to an embodiment.

In FIG. 1 a bracket 1 for a camera device according to an embodiment is illustrated. Certain components or details of the bracket are not visualized in FIG. 1 and viewing of FIG. 2 may clarify the discussions related to FIG. 1. The bracket 1 may be made of any suitable material and it may be made of, for example, metal or polymer material, which may be suitable materials providing endurance to the bracket 1 and being suitable for mass production.

The bracket 1 may be used outdoors or indoors. The bracket 1 has a wall mount 2 which may be used for attachment of the bracket to a wall or other suitable surfaces or objects such as for example a post, a pole, a ceiling, or a conduit box. The wall mount 2 illustrated in FIGS. 1 to 4 is suitable for mounting of the bracket 1 to a planar surface. It is realized that mounting of the bracket 1 to a non-planar surface may benefit from suitable adaptation. Alternatively, for mounting to non-planar surfaces, the wall mount may be mounted to a suitable adaptor, which is mounted to the non-planar surface. Such an adaptor may have a planar surface to which the wall mount 2 of the bracket 1 may be mounted and a non-planar surface adapted to the non-planar surface to which the bracket should be mounted. Attachment to e.g. a wall may suitably be realized by means of fastening means, such as, for example, screws or bolts, through first mounting holes 4. It is realized that attachment to e.g. a wall may be releasable attachment and that the attachment alternatively or in addition to fastening means may be made for example by gluing or welding. Extending from the wall mount 2 is an arm 6 providing support for an adjustable camera mount 8. To the camera mount 8 may be mounted any suitable type of camera device (not illustrated). By camera device, any suitable camera for monitoring and/or camera housing is intended. It is realized that the arm 6 further provides distance between the camera and the wall mount 2 which may realize, for example, easier adjustments to the camera and improved freedom of panning and tilting of the camera.

The camera mount 8 is adjustable by tilting and panning by means of a pivot arrangement 10, and a locking element 22, 24, 26 (not illustrated in FIG. 1 but illustrated in FIG. 2) is used for locking the position of the camera device once it is adjusted in a desired position. The pivot arrangement 10 comprises a socket 20 provided in the arm 6, in which socket a first member 12 is seated forming a pan joint 40 rotatable about a pan axis 50. Thus panning of a camera device mounted on the camera mount 8 is made possible. As seen in FIG. 1, the first member 12 at least partially encloses a second member 14 formed integral with the camera mount 8. Together, the first member and the second member form a tilt joint 42 rotatable about a tilt axis 52. Note that the pan axis 50 and a tilt axis 52 are indicated in FIG. 3. Thus, tilting of a camera mounted on the camera mount 8 is made possible. When mounted on the bracket attached to e.g. a wall, the camera device may be adjusted by tilting about the tilt axis 52 and panning about the pan axis 50, provided that the locking element is inactivated. It is an advantage to have two well defined axes around which movements may be realized as it provides predictable movements. The camera mount limits or prevents movements of the camera mount around other axes than the pan axis 50 and tilt axis 52 which is an advantage over having for example a ball joint enabling movement around an undefined number of axes and thereby introducing an unpredictability in the movements.

According to this example, the camera mount 8 is having a mount plane, wherein the tilt axis 52 extends in parallel to the mount plane and the pan axis 50 is orthogonal to the tilt axis 52. The mount plane in this example may be defined by the plane comprising the top edge of the camera mount 8. It will be understood that according to embodiments wherein the camera mount is having a mount plane wherein the tilt axis 52 extends in parallel to the mount plane and the pan axis 50 is orthogonal to the tilt axis 52, and provided that the bracket is mounted such that the tilt axis 52 is horizontal, horizontally aligned images may be realized.

It is beneficial that tilting and panning is made possible by means of the tilt joint 42 and the pan joint 40 respectively since panning and tilting thus may be made as separate actions, and the risk of, for example, unintentional tilting during panning movements are reduced and vice versa. Further, efficient horizontal pan movements are made possible.

The camera mount 8 is arranged for mounting of the camera device, such as, for example, by means of screws or bolts through second mounting holes 5 of the camera mount. The camera mount 8 may comprise a plate as is depicted in FIGS. 1 to 4. Alternatively the camera mount may be realized as a hole in the top portion of the second member, able to receive a screw, or a screw attached to the top portion of the second member, to which a camera or a camera housing may be mounted.

A locking element 26, 22, 24 (not illustrated in FIG. 1) may be activated for locking of the camera mount in an adjusted position. The locking element is further explained with reference to FIG. 2.

The bracket 1 illustrated in FIG. 1, thus efficiently may hold a camera in a locked position and a position suitable for monitoring purposes, such as monitoring of commercial establishments, homes, or public areas such as parks or streets, in different situations where monitoring by a camera device is desired.

Figure 2:
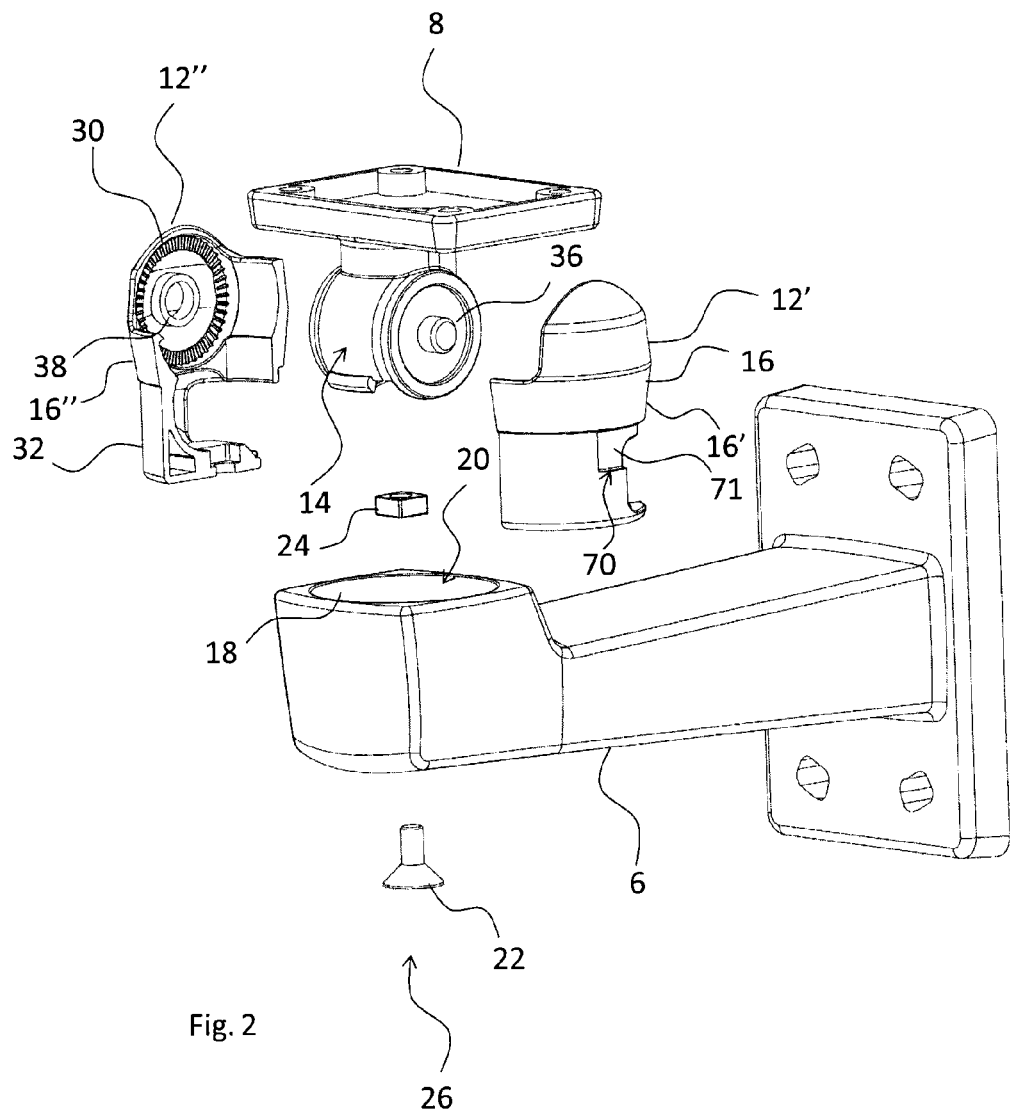
FIG. 2 is an exploded view of the bracket for a camera according to the embodiment illustrated in FIG. 1.

Turning to FIG. 2, an exploded view of the bracket of FIG. 1 is illustrated, further clarifying and exemplifying the embodiment discussed with reference to FIG. 1. From FIG. 2, it is realized that the first member 12 of the pivot arrangement according to this embodiment may be made in two parts 12' and 12". When mounted and part of the bracket 1, the two parts 12' and 12" encloses at least a part of the second member 14. The first member 12 has a cap shaped section 16. In this example, subsections 16' and 16" of the two parts 12' and 12" together form the cap shaped section 16. The cap shaped section 16 is arranged to be seated in a complimentary shaped seat portion 18 of the socket 20.

In FIG. 2, an example of the locking element 26 is illustrated. The locking element according to this example has a screw 22 and a nut 24. The screw 22, when mounted, is passing an opening through the bottom of the arm 6 into the socket 20, and further into the nut 24 fixed in a non-rotational manner at a bottom portion of first member 12. It is realized that with such a locking element, in combination with the tapering, or for example a semi spherical shape, of the first member 12, the locking element upon activation, such as in this example by tightening of the screw 22, will press the first member 12 against the seat portion 18 of the socket thereby locking the position of the pan joint and, in addition, generate locking forces acting on the second member 14 enclosed by the first member 12 for locking of the position of the tilt joint. Activation of the locking member 22, 24 according to this example and embodiment is made by tightening of the screw 22, thereby causing the first member to be pressed against the socket 20. In the embodiment exemplified by FIG. 2, the first member 12 has teeth 30 radially extending from a center for inducing improved locking between the first member 12 and the second member 14. Although not illustrated in FIG. 2, the second member 14 may have teeth, or grooves or recesses complimentary to the teeth 30. The bracket may also be functioning without these teeth 30 and/or grooves. The first member 12 further has a protrusion 32 extending in the socket when mounted, thereby enabling a panning movement but preventing tilting of the first member 12. The tilt joint 42 formed by the first member 12 and the second member 14 is rotatable about a tilt axis 52 which according to this embodiment comprises a shaft 36 and bearing 38 arrangement thereby allowing a tilt movement of the camera mount 8 when the locking arrangement is not activated. When the locking arrangement is activated, tilting movements will be prevented.

The cap shaped section 16 of the first member 12 may have teeth, for example teeth radially extending from the pan axis, and the seat portion 18 of the socket 20 may have teeth, or grooves or recesses complimentary to the teeth of the cap shaped section. Thus, improved locking between the first member 12 and the socket 20 may be realized. The bracket may also be functioning without these teeth 30 and/or grooves.

In this example, the tilt joint has a shaft 36 and bearing 38 arrangement. The shaft 36 is only visible on one side of the second member 14 in FIG. 2, but it is realized that also the other side of the second member 14 may have a shaft 36. Further, part 12" of the first member 12 may have a bearing 38, although not visible in FIG. 2. It is realized that the shaft 36 alternatively may be arranged on the first member 12 and the bearing 38 may be arranged on the second member 14. It is further noted that the tilt joint 42 may function without a shaft and bearing arrangement, for example by a circular cylindrical shape of the second member 14 combined with a correspondingly shaped section of the first member 12 enclosing the second member 14. According to another embodiment, a shaft may be provided extending along the tilt axis 52 through the first member 12 and through the second member.

Partial tightening of the locking element 26 may provide suitable friction between first member and the socket, and between the first member and the second member, such that e.g. adjustment by tilting may be made independently from adjustment by panning.

It can be noted from FIG. 2 that the cap shaped section 16 of the first member 12 according to the illustrated embodiment is of a frustoconical shape tapered towards the bottom of the socket when mounted. Such a shape, may provide both efficient locking of the pan joint and efficient locking of the tilt joint: By activation of the locking element 26 the cap shaped section 16 of the first member 12 will efficiently be pressed and locked against the seat portion 18 of the socket; and efficient locking forces acting on the second member enclosed by the first member for locking of the position of the tilt joint may be generated.

The wall mount, the arm, and the camera mount may comprise cavities for allowing of cables to a camera device to be fitted in the interior of the bracket. According to one embodiment and as illustrated by FIG. 2, the bracket may further include a panning stop 70, limiting the panning movement of the first member in relation to the socket and thereby preventing that the cables are clamped between the first member and the arm and thereby damaged. The panning movement may be limited to, for example, 190 degrees. In FIG. 2, the panning stop 70 is illustrated as a first recess 71 of the first member 12. The panning stop 70 further comprises a protrusion in the socket 20 interacting with the first recess 71 of the first member 12.

According to one embodiment, the cap shaped section may be tapered in a direction towards a bottom the socket.

The cap shaped section 16 of the first member may be frustoconically shaped, of tapered shape, semi spherically shaped, or conically shaped.

The seat of the socket may be frustoconically shaped, of tapered shape, semi spherically shaped, or conically shaped.

According to one embodiment, the locking arrangement 26 may comprise a screw 22 and a nut 24. The nut 24 may be embedded in a bottom portion of the first member 12. The nut may be arranged in the first member 12 in a second recess 80 with a complimentary shape to the nut, for example as illustrated in FIG. 5. It is realized that the locking arrangement 26 may be of any type suitable for the purpose, for example the locking arrangement 26 may alternatively be arranged with a screw arranged attached to the first member 12 and a nut arranged to be tightened on the screw against the arm.

The locking element may alternatively comprise a screw, and the first member may comprise a recess or aperture with threads complimentary to the screw. In such a case, no nut is needed.

The locking element may alternatively comprise an element that is attached to the bottom portion of the first member 12 and proceeds through the socket and arm, and locked on the outside of the arm. The locking element may, for example, be of a quick release skewer type.

FIGS. 3 and 4 illustrates front and side views of the bracket 1 illustrated in FIGS. 1 and 2, respectively. Approximate positions of the pan axis 50 and tilt axis 52 are indicated in FIGS. 3 and 4 by dotted lines and a crossed circle.

FIGS. 5 and 6 illustrates the bracket 1 as normally seen from above and as normally seen from below when the bracket is mounted on a wall, respectively. Approximate positions of the pan axis 50 and tilt axis 52 are indicated in FIGS. 3 and 4 by dotted lines and a crossed circle. Note that according to this embodiment as illustrated by FIGS. 3 to 6, the tilt axis 52 and the pan axis 50 are orthogonal and that the tilt axis is parallel to a mount plane 9 of the camera mount 8.

The invention claimed is:

1. Bracket for a camera device, comprising:
   a wall mount,
   an arm extending from the wall mount,
   an adjustable camera mount supported by the arm, and
   a locking element for locking of the camera mount in an adjusted position, the camera mount being adjustable by tilting and panning by means of a pivot arrangement comprising
   a socket provided in the arm,
   a first member seated in the socket, and a second member, wherein the first member is formed in two pieces which in an assembled state are arranged to enclose the second member,
   wherein the second member is formed integral with said camera mount,
   wherein the socket and first member form a pan joint rotatable about a pan axis,
   wherein the first member and the second member form a tilt joint rotatable about a tilt axis, and
   wherein the locking element upon activation is being arranged to press the first member against the socket in order to lock a position of the pan joint and to generate locking forces acting on the second member enclosed by the first member for locking of the position of the tilt joint.

2. The bracket according to claim 1, wherein the camera mount is having a mount plane, wherein the tilt axis extends in parallel to the mount plane of the camera mount, and the pan axis is orthogonal to the tilt axis.

3. The bracket according to claim 1, wherein the locking element comprises a screw extending through a bottom of the socket, whereby the locking element is arranged for locking of the camera mount in an adjusted position by tightening of the screw causing the first member to be pressed against the socket.

4. The bracket according to claim 1, wherein the first member comprises a cap shaped section seated in the socket and a protrusion having an extension in the socket and cooperating therewith in order to prevent tilting of the first member relative to the socket.

5. The bracket according to claim 4, wherein the seat of the socket being frustoconically shaped.

6. The bracket according to claim 4, wherein the cap shaped section of the first member being frustoconically shaped.

7. The bracket according to claim 4, wherein the shape of the seat of the socket is complementary to the shape of the cap shaped section of the first member.

8. The bracket according to claim 7, wherein the protrusion being cylindrically shaped and extending in a complementary shaped cavity of the socket.

9. The bracket according to claim 1, wherein the tilt joint comprises a shaft and bearing arrangement.

10. The bracket according to claim 1, wherein the wall mount, the arm, and the camera mount comprise cavities for allowing of cables to a camera to be fitted in the interior of the bracket.

11. Camera system comprising:
    the bracket according to claim 1, and a camera supported by the bracket.

\* \* \* \* \*